Sept. 3, 1940.   G. H. HOOPER   2,213,912
MOTOR VEHICLE
Filed Aug. 10, 1936   3 Sheets-Sheet 1
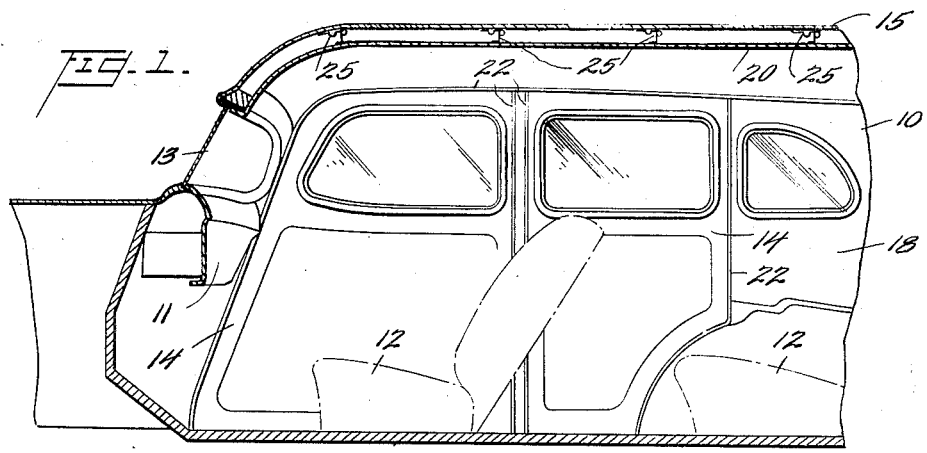
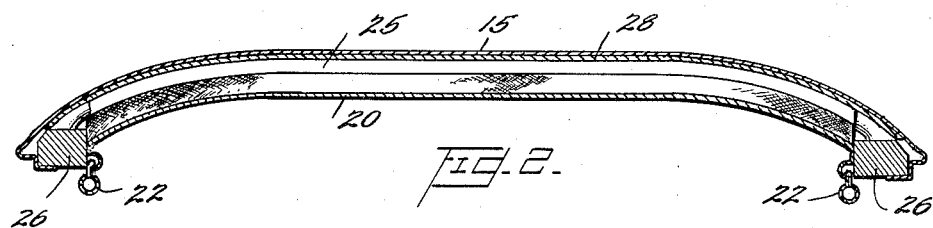
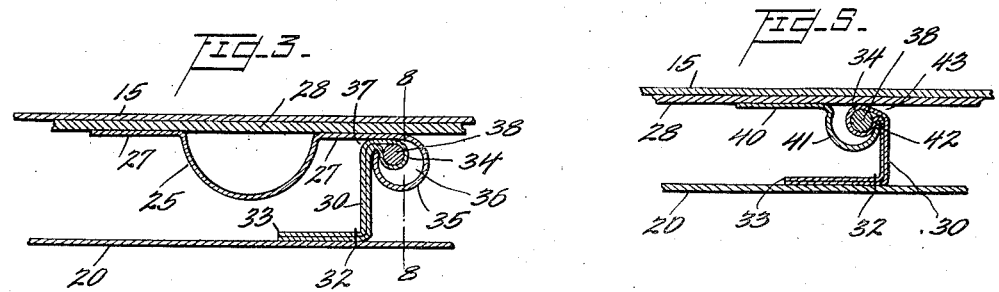
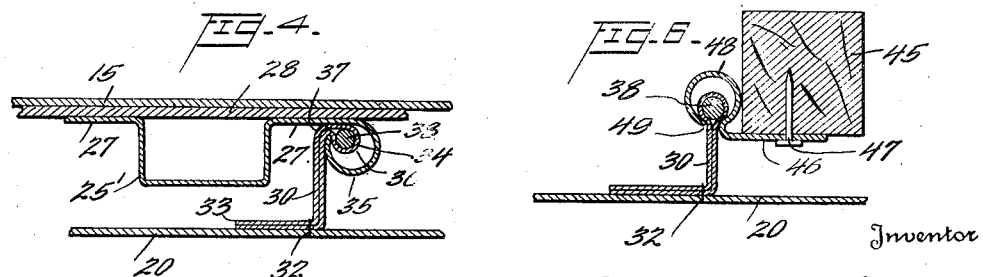
Inventor
George H. Hooper,
By Watson, Coit, Morse
& Grindle
Attorney Sept. 3, 1940.　　　　G. H. HOOPER　　　　2,213,912
MOTOR VEHICLE
Filed Aug. 10, 1936　　　3 Sheets-Sheet 2
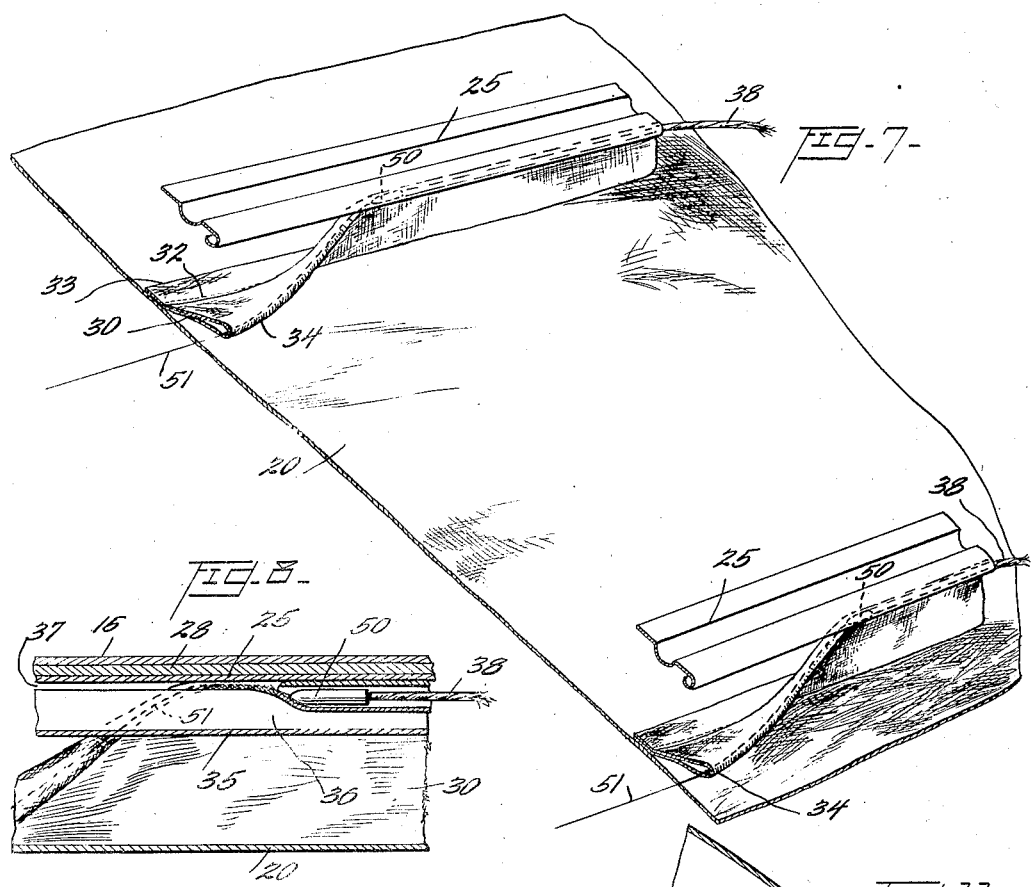
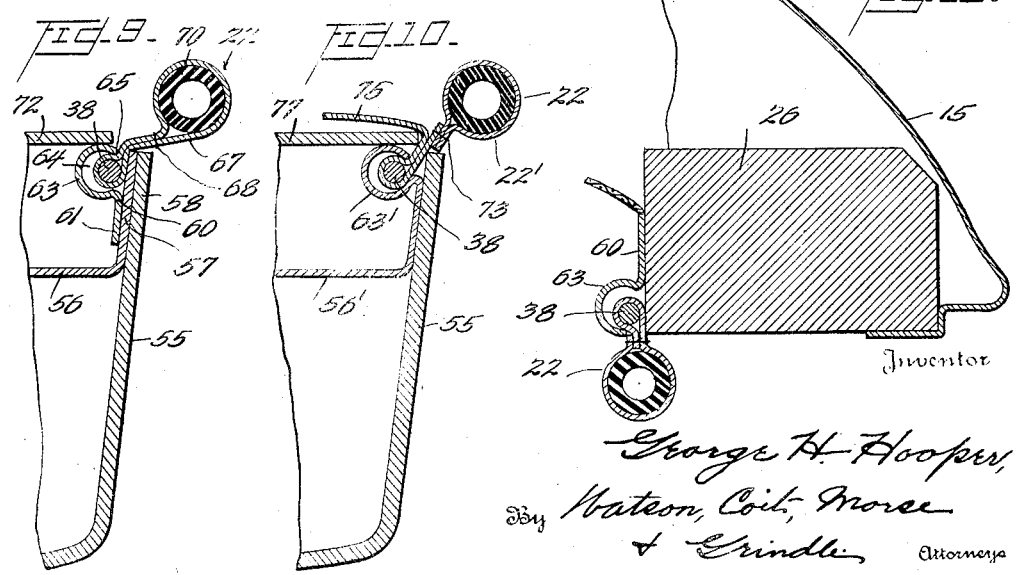
Inventor
George H. Hooper,
By Watson, Coit, Morse
& Grindle, Attorneys

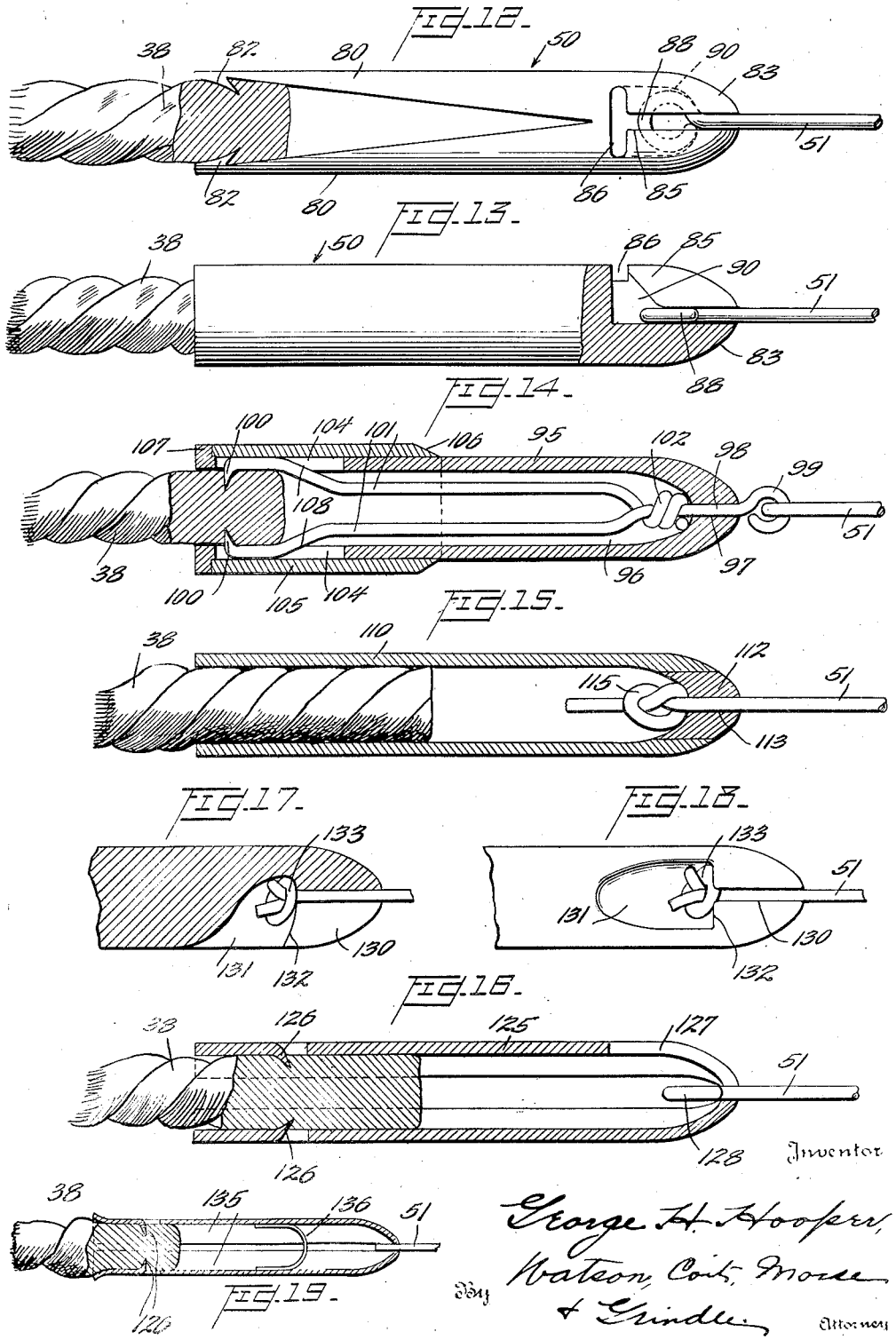

Patented Sept. 3, 1940

2,213,912

UNITED STATES PATENT OFFICE 2,213,912

MOTOR VEHICLE

George H. Hooper, Detroit, Mich.

Application August 10, 1936, Serial No. 95,253

1 Claim. (Cl. 45—138)

This invention relates to motor vehicles and more particularly to the application of the upholstery or interior trim to the bodies and tops of such vehicles or to similar structures or enclosures.

The general object of the invention is to provide an improved upholstery installation for vehicle bodies or structures of similar type and also to provide novel methods and apparatus for attaching the various elements of the upholstery or trim to the body frame.

Although applicable to the installation of any portion of the fabric trim of the vehicle body, my invention is especially useful in connection with the suspension of the headlining from the top structure, whereby the use of numerous fastening elements is obviated and much time and effort saved. Furthermore, when installed in accordance with my invention the headlining presents a smooth and even undersurface unmarred by any unsightly sagging of the lining material.

In its preferred embodiments, the invention contemplates the provision of elongated retaining members constructed preferably of metal and if desired formed integrally with certain structural elements of the body or top frame. These retaining members are shaped and disposed so as to provide grooves or elongated recesses having narrow slots or openings throughout their length which are of less width than the inner portion of the grooves or recesses. The upholstery fabric which is to be secured to the framing is provided adjacent the points where these grooves occur, with looped or folded portions which when the upholstery is in place are retained within the grooves or recesses by means of filler cords which are inserted in the loops and serve to form an expanded edge or beading which is of greater diameter than the width of the slotted openings or mouths of the grooves.

In accordance with the present invention, the filler cords are inserted within the looped or folded attaching portions of the fabric at the same time that the upholstery is applied, and in such a manner that the attaching portions are brought into place within the grooves by the insertion of the filler cord. The means for accomplishing this efficient application of the upholstery comprise an important feature of the invention and include certain detachable shuttle-like members by which the filler cords are guided into the fabric loops and which serve also to draw these loops or folds into place within the grooves of the supporting members.

The objects of the invention also include the provision of several forms of shuttle or "dodger" employed for inserting the filler cords and guiding the fabric supporting portions of the upholstery into position.

Other objects of the invention and additional features of novelty will be apparent from the following specification when read in connection with the accompanying drawings in which certain embodiments of my invention are illustrated by way of example.

In the drawings:

Figure 1 is a fragmentary view in vertical longitudinal section of the body of a motor vehicle embodying in its interior trim the principles of my invention;

Figure 2 is a vertical transverse sectional view of the top of the same vehicle on a somewhat larger scale;

Figures 3, 4, 5 and 6 are fragmentary sectional views on a further enlarged scale taken transversely of the cross members of the vehicle top and illustrating in various forms the means for supporting the headlining;

Figure 7 is a view in perspective of the headlining and certain of the cross members, the top being omitted in order to better illustrate the method of installation of the headlining;

Figure 8 is a fragmentary vertical cross sectional view taken for example along line 8—8 of Figure 3, and also showing the method of attachment of the headlining;

Figures 9 and 10 are partial horizontal sectional views through body pillars at the door openings showing certain wind cord and upholstery connections at this point;

Figure 11 is a transverse vertical sectional view through one of the side members of the top structure showing the attachment of the wind cord at the top of the door opening;

Figure 12 is a plan view of one of the shuttle-like members or "dodgers" employed in installing the headlining, wind cords, or other upholstery in the car body;

Figure 13 is a view in side elevation of the member shown in Figure 12 with the forward end illustrated in vertical longitudinal section;

Figures 14, 15 and 16 are longitudinal sectional views of other embodiments of the shuttle or dodger member;

Figure 17 is a fragmentary longitudinal sectional view of the forward end of still another form of dodger;

Figure 18 is a plan view of the forward end of the member illustrated in Figure 17; and Figure 19 is a longitudinal sectional view on a reduced scale of a still further modification of the dodger member.

In Figure 1 of the drawings, the reference numeral 10 is employed to designate generally the body of a motor vehicle which exemplifies the application of my invention. The body 10 of this vehicle is provided with the usual equipment such as the instrument panel 11, the seats 12, the windshield 13, the doors 14 and the top 15; the last named element being preferably, although not necessarily, of an all-steel type.

As is usual in all such constructions, the interior of the vehicle body is furnished with upholstery which includes the fabric wall coverings or linings 18, headlining 20, wind cords 22, and other ornamental and protective members, all of which are subject to application or installation in the vehicle by means of the present invention.

As indicated in Figure 1 of the drawings and shown to better advantage in Figures 2-6, the top 15 of the vehicle is provided on its underside with the cross members 25 which serve both to support and reinforce the top structure and to provide means from which the headlining 20 may be suspended. The top structure is also provided with the side frame members 26 to which the ends of the cross members 25 may be suitably connected. As illustrated in Figures 3 and 4 of the drawings the cross members 25 (and 25' in the squared form illustrated in Figure 4) comprise channel members of substantially U-shape configuration having laterally flaring wings or flanges 27 by means of which they are secured to the top construction 15. In the embodiments illustrated in these figures there is shown an intermediate strip 28 which may be interposed between the metal top and the cross members.

The headlining fabric 20 is provided at intervals with listings 30 which extend transversely of the headlining and comprise doubled strips of cloth forming loops and secured to the headlining by means of the blind stitching 32, which, it will be noted, is applied at a considerable distance from the free edges 33 of the listing, so as to prevent any possibility of the warp and woof threads becoming unraveled. Either one of the flanges 27 or both of them if desired, may be shaped to receive the looped portions 34 of the listings 30. The side edges of the flanges 27 are curled or rolled as clearly shown at 35 so as to provide a bead having a recess 36 therein for the reception of the looped edge of the listing. The edge of the curved flange is spaced somewhat from the flat portion of the flange 27 so as to provide a narrow restricted opening or mouth 37 for the hollow interior of the bead 35. Within the loop 34 of the listing, as it is inserted in the hollow bead of the cross member there is disposed a filler cord 38 which may be composed of twisted yarns, cords, fabric, paper or the like. This member provides an enlargement on the listing which prevents its withdrawal through the narrowed slot or opening 37 of the recess 36.

In Figure 5 of the drawings the cross member 40 comprises a flat strip of metal, one side portion of which is curved downwardly and then upwardly so as to provide a substantially trough-shaped portion 41, the extreme edge 42 of which is spaced from the top 15 so as to provide a restricted opening 43 through which the looped portion 34 of the listing 30 may extend. In this case as in the ones earlier described the filler cord 38 is provided in order to prevent the withdrawal of the listing from the recess of the cross member.

In Figure 6 there is illustrated an embodiment in which a wooden cross member 45 is provided. A securing strip 46 is secured along the underside of the cross member 45 by means of the fastening elements indicated at 47. The strip 46 is provided with an inverted trough-shaped side portion 48 having a downwardly opening mouth 49 formed between the converging side portions of the trough 48 for the reception of the listing 30. The filler cord is illustrated at 38.

The method of applying the headlining to the cross members and which may also be used in installing other elements of the upholstery or trim, will now be described. In this connection, reference is made more particularly to Figures 7 and 8 of the drawings. In each of the looped portions 34 of the listing 30 of the headlining 20 there is enclosed a length of string or wire 51. If string is employed, it may be enclosed within the looped listing at the time that the listing is stitched to the headlining. If flexible wire is used, it may be laced through the headlining loop just before the headlining is to be installed. Suitably secured to the end of the string or wire 51 is a round nosed shuttle-like member 50, termed a dodger, and which serves to lead the trailing filler cord 38 through the listing as it is applied. The remote end of the looped listing is inserted through the mouth of the channel or recess in the cross member 25, the nose of the dodger 50 is inserted in the looped portion 34 of the listing which then occupies the recess, and the string or wire 51 is pulled from the other end of the listing. This causes the dodger to travel down the channel or recess behind the narrow or restricted opening or mouth thereof at the same time drawing the loop 34 of the listing 30 through the opening and into the wider inner portion of the channel or recess. The filler cord 38 which trails behind the dodger is thus drawn through the loop and forms a bead on the listing which prevents its lateral withdrawal from the channel of the retaining member. When the dodger 50 appears at the other end of the listing loop, it is separated from the filler cord 38 or the latter may be severed and terminally fastened to the framework of the body to prevent inadvertent removal thereof.

Wherever the cross members 25 terminate too closely to the side members 26 for the dodger to be inserted longitudinally in the channel, the mouth of the channel may be pried open to permit the dodger as well as the portion of the listing surrounding it to be inserted laterally. After the application of the headlining has been effected, the channel portions may be returned to their normal positions, thus preventing displacement of the filler cord. Any suitable tool may be employed to spread the channel for this purpose.

It is obvious that this method of application may be applied to any element of the upholstery fabric and also that the fabric may be attached to follow the contour of the vehicle frame whether straight or curved, and the installation of the upholstery or trim is effected without the use of numerous fastening elements and their attendant waste of time and effort.

As an example of a further application of the invention, there are illustrated in Figures 9, 10 and 11 of the drawings several installations of the wind cord which is commonly employed around the door openings of a vehicle.

In Figures 9 and 10, portions of the metal body pillars which form jambs for the doors are indicated at 55. These pillars are of a generally U-shaped cross section, only substantially half of each one being shown in the figures referred to. The free ends of the arms of the U-shaped section are connected by the pillar brace 56, in Figure 9, which is a somewhat shallow U-shaped member having its arms 57 welded or otherwise secured to the arms 58 of the pillar 55. A strip 60 has a flange 61 welded or otherwise secured to the pillar brace 56 as shown and is provided with a rolled edge 63 which provides a channel or recess 64 having a restricted opening or mouth 65 adapted to receive the attaching portions of the wind cord indicated generally by the reference character 22.

The wind cord element 22 in this particular embodiment is formed of a tubular piece of fabric 67 secured together as by the stitching 68 so as to provide a double tubular member having a cross sectional configuration of a figure 8. One of the tubular portions of the member is provided with a flexible core 70 which may be a length of rubber tubing or any other convenient material which will provide a flexible weather excluding element. The other tubular portion of the member 22 is adapted to be drawn into the recess 64 of the retaining strip 60 in the same way as described in connection with the installation of the headlining listing. One end of the tubular fabric is inserted in the opening 65, then the dodger is introduced along with its filler cord 38, and the dodger and cord are drawn through the tubular member whereupon the latter is drawn into the channel of the retaining member and the filler cord 38 prevents the withdrawal thereof. Any type of covering or facing material 72 may be applied to the open side of the pillar 55 during or after the installation of the wind cord.

In Figure 10 there is illustrated a wind cord installation in which the tubular portions of the wind cord element 22' are made separately and stitched together as at 73. The looped portion which is drawn into the retaining recess or channel by means of the dodger and held in place by means of the filler cord 38 may be extended as at 75 to provide the fabric covering material for the inner side of the pillar so that this element of the upholstery may be applied at the same time as the wind cord. A stiffening backing strip 77 is provided to underlie the covering material 75. In Figure 10, it will be noted, the pillar brace 56' has been made integral with the retaining strip by merely rolling or curving the edges of the brace 56' to form the bead or channel enclosing portion 63'.

In Figure 11 an upper wind cord member 22 is secured to the side member 26 of the top of the vehicle by means of the retaining strip 60 in a manner as described in connection with the other embodiments.

Several embodiments of the shuttle-like dodger member 50 have been developed in the present invention. In Figures 12 and 13 of the drawings one embodiment is illustrated in which a bifurcated member is employed having the legs 80 which grip the forward end of the filler cord 38 and prevent its withdrawal by means of the barbs 82. The forward rounded end 83 of the dodger is provided with a narrow vertical slot 85 extending longitudinally thereof and a transverse slot 86 is cut at the rear end of the slot 85 forming a substantially T-shaped cut in the upper half of the head of the dodger. The lead wire 51 in this case is provided with a loop 88 and is inserted radially of the member 50 into the slot 86, and then rotated downwardly through the widened under-cut portion 89 and then pulled forwardly against the forward wall of the pocket 90 shown by dotted lines in Figure 12. After the filler cord 38 has been drawn into position through the length of the member being installed, the dodger 50 may be removed from the filler member and the wire 51 may be detached from the forward end of the dodger.

In Figure 14 the dodger member is seen to comprise a tubular body portion 95 provided with an interior bore 96 closed at the forward end except for the small opening 97 provided for the accommodation of the wire member 98 forming the eye 99 to which the lead cord or wire may be attached. The forward end of the filler cord 38 is introduced into the rear end of the bore 96 and is seized by the prongs 100 provided on the ends of the wire arms 101 of the inner element which includes the rearward extension of the wire 98 forming one of the legs, the other leg being conveniently formed separately and secured by twisting as at 102. The two legs 101 are normally sprung apart and may extend outwardly through the slots 104 provided in the walls of the tubular portion 95. A sliding annulus 105 having a chamfered forward end 106 is applied exteriorly of the body member 95 and its withdrawal in a rearward direction is prevented by the shoulder 107. When this annulus is slid forwardly so as to uncover the slot 104 the legs 100 of the inner gripping member may spread and permit the introduction of the forward end of the filler cord 38 then the annulus 105 is moved rearwardly forcing the legs 101 toward each other by its contact with the inclined surfaces 108 thereof. Forward movement of the annulus will obviously permit the spreading of the gripping legs 101 and the withdrawal of the filler cord 38.

In Figure 15 there is illustrated a simple and convenient form of dodger. The filler cord 38 is introduced into the open rear end of the tubular body member 110 and is retained there by frictional contact. The forward end of the tubular member 110 is plugged by means of the piece of solder or the soft metal insert 112 which is provided with a central bore 113 for the admission of the lead wire or cord 51. This cord is knotted as at 115 to prevent its withdrawal forwardly.

In Figure 16 the dodger member is formed of a substantially U-shaped piece of spring metal, the arms 125 of which are given a transverse curvature to fit in the cylindrical contour of the filler cord 38. The spurs or barbs 126 are struck from the legs inwardly to prevent the withdrawal of the filler cord. The forward end of the dodger is provided with a vertical slot 127 which passes through one of the legs of the device near the nose and through it the loop 128 of the lead wire 151 may be inserted flatwise and then given a quarter turn to assume the operative position shown in the drawings.

In Figures 17 and 18 a simple arrangement is depicted in which the vertical slot 130 is provided in the nose of the dodger so as to extend longitudinally thereof and communicate with a recess or pocket 131 having the forward wall 132 against which the knot 133 of the lead cord 51 is adapted to lie with the cord itself occupying the longitudinal slot 130.

The modification illustrated in Figure 19 of the drawings resembles in its construction and operation the familiar pincer or clip type of clothes pin. The generally tubular dodger member in this case is split longitudinally to provide two laterally spaced half portions 135 which are joined intermediate their lengths by means of the U-shaped spring element 136. Interiorly of the members 135, there are provided the spurs or teeth 126, as in the embodiment illustrated in Figure 16, to aid in retaining the filler cord 38. The rear end of the lead wire 51 is received between the forward ends of the two portions 135 and is gripped by the tension exerted by the spring 136. It will be readily understood that when the puller cord or wire 51 is inserted in the forward end it will cause the dodger to spread slightly at this end and contract at the rear end so as to aid in retaining the filler cord. Conversely, any tendency toward expansion of the filler cord 38 when compressed into the rear end of the dodger will cause the forward end of the dodger to grip the puller or lead wire 51 to be gripped more firmly.

It will be understood that various changes and modifications may be made in the methods, apparatus, and structures described herein without departing from the scope of the invention as defined by the subjoined claim.

Having thus described the invention, what is claimed as new and desired to be secured by Letters Patent is:

The method of applying upholstery or the like to a structure provided with a channel having a restricted slot opening extending throughout the length thereof, which comprises forming a loop in the fabric of the upholstery member, enclosing a pull strand in the loop so that it extends from one end of the loop to the other, inserting one end of the loop through said opening into said channel at one end thereof, attaching a shuttle-like pilot member to one end of said pull strand, attaching a filler cord to said pilot member, pulling said strand from the opposite end of said loop so that said pilot member enters the first named end of the loop within the channel and traverses the length of the channel drawing the remainder of the loop sideways through the opening and into the channel where it is retained by the filler cord.

GEORGE H. HOOPER.